US012608065B2

(12) United States Patent
Yang et al.

(10) Patent No.: US 12,608,065 B2
(45) Date of Patent: Apr. 21, 2026

(54) SYSTEM, METHOD, APPARATUS AND DEVICE FOR MEASURING POWER CONSUMPTION OF SERVER, AND STORAGE MEDIUM

(71) Applicant: SUZHOU METABRAIN INTELLIGENT TECHNOLOGY CO., LTD., Suzhou (CN)

(72) Inventors: Xiaoran Yang, Suzhou (CN); Wujun Wang, Suzhou (CN); Dali Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/130,316

(22) PCT Filed: Jun. 24, 2024

(86) PCT No.: PCT/CN2024/101005
§ 371 (c)(1),
(2) Date: May 15, 2025

(87) PCT Pub. No.: WO2025/077285
PCT Pub. Date: Apr. 17, 2025

(65) Prior Publication Data
US 2026/0010215 A1 Jan. 8, 2026

(30) Foreign Application Priority Data
Oct. 11, 2023 (CN) .......................... 202311309122.4

(51) Int. Cl.
*G06F 1/28* (2006.01)
(52) U.S. Cl.
CPC ..................................... *G06F 1/28* (2013.01)

(58) Field of Classification Search
None
See application file for complete search history.

(56) References Cited

U.S. PATENT DOCUMENTS 11,385,985 B2 * 7/2022 Wang .................... G06F 1/3237
11,409,620 B2 * 8/2022 Dong ........................ G06F 1/30
(Continued)

FOREIGN PATENT DOCUMENTS

CN 106886479 A 6/2017
CN 108287780 A 7/2018
(Continued)

*Primary Examiner* — Kim Huynh
(74) *Attorney, Agent, or Firm* — IPro, PLLC

(57) ABSTRACT

The present disclosure provides a system for detecting power consumption of a server. The system includes a baseboard management controller, power supply units and monitoring components corresponding to components to be detected, each power supply unit and each monitoring component each includes a real-time data register and a power consumption temporary storage register the monitoring component stores component power consumption data into the real-time data register and copies component power consumption data to the power consumption temporary storage register; the power supply unit stores power supply power consumption data into the real-time data register and copies power supply power consumption data to the power consumption temporary storage register; the baseboard management controller transmits the power consumption read signal to the power supply unit and the monitoring component; and reads the component power consumption data and the power supply power consumption data from the power consumption temporary storage registers.

19 Claims, 3 Drawing Sheets

(56) References Cited

U.S. PATENT DOCUMENTS

2009/0144568 A1 *   6/2009   Fung ...................... G06F 1/324
713/300
2018/0246483 A1     8/2018   Belgera et al.

FOREIGN PATENT DOCUMENTS

| | | | |
|---|---|---|---|
| CN | 111581043 | A | 8/2020 |
| CN | 117055718 | A | 11/2023 |
| EP | 3467995 | A1 | 4/2019 |

* cited by examiner

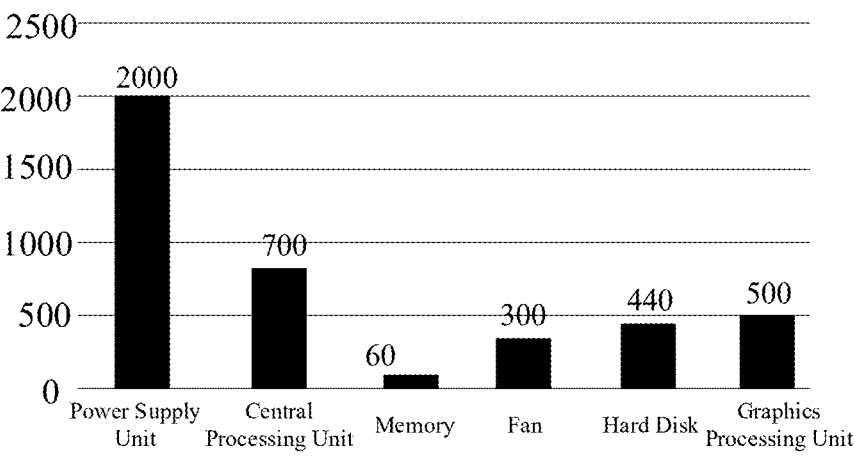

FIG. 3

Power consumption read signal is simultaneously transmitted to each power supply unit and each monitoring component under the condition of receiving an overall power consumption read command, so as to enable the power supply unit to copy power supply power consumption data at the current moment recorded in a real-time data register to a power consumption temporary storage register corresponding to the power supply unit and the monitoring component to copy component power consumption data at the current moment recorded in a real-time data register to a power consumption temporary storage register corresponding to the monitoring component

S401

The component power consumption data and the power supply power consumption data are read from the power consumption temporary storage registers

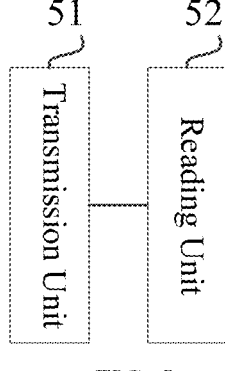

51    52

Transmission Unit     Reading Unit

Program

SYSTEM, METHOD, APPARATUS AND DEVICE FOR MEASURING POWER CONSUMPTION OF SERVER, AND STORAGE MEDIUM

CROSS-REFERENCE TO RELATED APPLICATION

The present disclosure claims the priority of Chinese patent application number 202311309122.4, filed with the CNIPA, China National Intellectual Property Administration, on Oct. 11, 2023, and entitled "SYSTEM, METHOD, APPARATUS AND DEVICE FOR MEASURING POWER CONSUMPTION OF SERVER, AND STORAGE MEDIUM", which is incorporated herein in its entirety by reference.

FIELD

The present disclosure relates to the field of server technologies, and more particularly to a system, a method, an apparatus and a device for detecting power consumption of a server, and a non-transitory readable storage medium.

BACKGROUND

With the continuous improvement of the performance of a server, overall power consumption of the server is also increasing. The server includes different types of components such as fans, graphics processing units (GPUs), hard disks, central processing units (CPUs) and memories. Each of the components will generate corresponding power consumption. In the related art, a baseboard management controller (BMC) sends an intelligent platform management interface (IPMI) command through an IPMI, and obtains power consumption of these components such as fans, GPUs and hard disks through a communication bus (Inter-Integrated Circuit, I2C). The BMC communicates with a south bridge chip (platform controller hub, PCH), and obtains the power consumption of the CPUs and the power consumption of the memories relying on an Intel management engine (ME) built in the PCH. By obtaining the power consumption of each component, the distribution of the overall power consumption may be obtained.

The server includes a plurality of power supply units (PSUs), and a sum of power consumption of all the PSUs can be used as the overall power consumption of the server. Since the limitation of a round robin mechanism of the BMC, the BMC cannot read the power consumption of the plurality of PSUs at the same time. Since the dynamic nature of the power consumption, finally obtained overall power consumption is the sum of the power consumption of PSUs at different moments, and there is a relatively large deviation between the finally obtained overall power consumption and actual power consumption. Similarly, the power consumption of each component is a dynamic value, and the BMC reads power consumption in a round robin manner. After reading power consumption of a PSU, the BMC sends a command to read power consumption of the remaining PSUs and the power consumption of each component. Since there is a time difference between commands, the collected power consumption of the PSU and the power consumption of each component are at different moments, which cannot meet requirements of customers for the accuracy of the power consumption monitoring.

SUMMARY

The purpose of embodiments of the present disclosure is to provide a system, a method, an apparatus and a device for detecting power consumption of a server, and a non-transitory readable storage medium, which may improve the accuracy of power consumption monitoring.

In order to solve the above technical problems, the embodiments of the present disclosure provide a system for detecting power consumption of a server, including a baseboard management controller, a plurality of power supply units and one or more monitoring components corresponding to one or more components to be detected, where each of the plurality of power supply units and each of the one or more monitoring components each includes a real-time data register and a power consumption temporary storage register;

the monitoring component is configured to store collected component power consumption data of the component to be detected into the real-time data register corresponding to the monitoring component; and copy component power consumption data at a current moment recorded in the real-time data register corresponding to the monitoring component to the power consumption temporary storage register corresponding to the monitoring component under the condition of receiving a power consumption read signal transmitted by the baseboard management controller;

the power supply unit is configured to store collected power supply power consumption data into the real-time data register corresponding to the power supply unit; and copy power supply power consumption data at the current moment recorded in the real-time data register corresponding to the power supply unit to the power consumption temporary storage register corresponding to the power supply unit under the condition of receiving the power consumption read signal transmitted by the baseboard management controller; and the baseboard management controller is connected to the power supply unit and the monitoring component, and is configured to simultaneously transmit the power consumption read signal to the power supply unit and the monitoring component under the condition of receiving an overall power consumption read command; and read the component power consumption data and the power supply power consumption data from the power consumption temporary storage registers.

In some embodiments of the present disclosure, a general-purpose input/output pin of the baseboard management controller is connected in series to an alarm signal pin of the power supply unit and an alarm signal pin of the monitoring component, where the alarm signal pin is a bidirectional port pin supporting input and output; and the baseboard management controller is configured to simultaneously transmit the power consumption read signal to the alarm signal pin of the power supply unit and the alarm signal pin of the monitoring component under the condition of receiving the overall power consumption read command.

In some embodiments of the present disclosure, the monitoring component is configured to transmit an alarm signal to the baseboard management controller through the alarm signal pin under the condition that it is detected that an abnormality occurs in the component to be detected; and the baseboard management controller is configured to switch the baseboard management controller to a slave mode under the condition of receiving the alarm signal transmitted by the monitoring component, where the baseboard management controller stops transmitting the power consumption read signal to the monitoring component in the slave mode.

In some embodiments of the present disclosure, the monitoring component is configured to obtain a device type of the component to be detected monitored by the monitoring component; and generate the alarm signal according to a data format matched with the device type.

In some embodiments of the present disclosure, the baseboard management controller is configured to determine a target component to be detected corresponding to the alarm signal according to the data format of the alarm signal under the condition of receiving the alarm signal transmitted by the monitoring component; and display prompt information of a failure of the target component to be detected through a front panel.

In some embodiments of the present disclosure, the monitoring component is configured to, after copying the component power consumption data at the current moment recorded in the real-time data register corresponding to the monitoring component to the power consumption temporary storage register corresponding to the monitoring component, clear the power consumption temporary storage register corresponding to the monitoring component according to a set time interval, and copy the component power consumption data at the current moment recorded in the real-time data register corresponding to the monitoring component to the power consumption temporary storage register corresponding to the monitoring component.

In some embodiments of the present disclosure, the monitoring component is configured to clear the power consumption temporary storage register corresponding to the monitoring component, and copy the component power consumption data at the current moment recorded in the real-time data register corresponding to the monitoring component to the power consumption temporary storage register corresponding to the monitoring component after copying the component power consumption data at the current moment recorded in the real-time data register corresponding to the monitoring component to the power consumption temporary storage register corresponding to the monitoring component and under the condition of receiving the power consumption read signal transmitted by the baseboard management controller again.

In some embodiments of the present disclosure, the baseboard management controller is configured to convert the read component power consumption data and the read power supply power consumption data into a histogram, and display the histogram through a front panel, where the histogram takes a component type as a horizontal axis and power consumption as a vertical axis.

In some embodiments of the present disclosure, the baseboard management controller is configured to read the component power consumption data and the power supply power consumption data from the power consumption temporary storage registers according to a set time interval; and update the histogram according to the currently read component power consumption data and the currently read power supply power consumption data.

In some embodiments of the present disclosure, a number of power consumption temporary storage registers is plural; and the power supply unit and the monitoring component each corresponds to a power consumption temporary storage register, where the power consumption temporary storage registers are registers customized based on a blank register embedded in the power supply unit and a blank register embedded in the monitoring component.

In some embodiments of the present disclosure, the baseboard management controller is respectively connected to the power consumption temporary storage register embedded in the monitoring component and the power consumption temporary storage register embedded in the power supply unit through a serial bus, and is configured to obtain the component power consumption data and the power supply power consumption data recorded in the power consumption temporary storage registers.

In some embodiments of the present disclosure, a number of power consumption temporary storage registers is one, the power supply unit and the monitoring component each corresponds to a same power consumption temporary storage register, where the power consumption temporary storage register is a register arranged independently, and the real-time data register embedded in the power supply unit and the real-time data register embedded in the monitoring component are connected to the power consumption temporary storage register.

In some embodiments of the present disclosure, the baseboard management controller is configured to sum all the power supply power consumption data to obtain total power supply power consumption; sum all the component power consumption data to obtain total component power consumption; determine whether a deviation between the total power supply power consumption and the total component power consumption is less than a set threshold; and simultaneously transmit the power consumption read signal to the power supply unit and the monitoring component under the condition that the deviation between the total power supply power consumption and the total component power consumption is greater than or equal to the set threshold.

In some embodiments of the present disclosure, the baseboard management controller is configured to increase a number of errors by one when the deviation between the total power supply power consumption and the total component power consumption is greater than or equal to the set threshold every time; determine whether the number of errors is greater than or equal to a set error limit; perform the step of simultaneously transmitting the power consumption read signal to the power supply unit and the monitoring component under the condition that the number of errors is less than the error limit; and display prompt information of abnormal power consumption through a front panel under the condition that the number of errors is greater than or equal to the error limit.

In some embodiments of the present disclosure, the baseboard management controller is configured to determine whether an alarm signal is received under the condition of receiving the overall power consumption read command; and simultaneously transmit the power consumption read signal to the power supply unit and the monitoring component under the condition of not receiving the alarm signal.

In some embodiments of the present disclosure, the monitoring component is configured to determine whether there is an unrecognizable data format under the condition of receiving the power consumption read signal transmitted by the baseboard management controller; transmit the alarm signal to the baseboard management controller under the condition that there is the unrecognizable data format; and perform the step of copying component power consumption data at a current moment recorded in the real-time data register corresponding to the monitoring component to the power consumption temporary storage register corresponding to the monitoring component under the condition that there is no unrecognizable data format.

In some embodiments of the present disclosure, the component to be detected includes a memory, where the monitoring component corresponding to the memory is connected to the memory through a precision resistor and a current monitoring chip, and is configured to determine a memory voltage value corresponding to the memory according to a resistance value of the precision resistor and a current value detected by the current monitoring chip;

the monitoring component corresponding to the memory is connected to a power supply of the memory, and is configured to obtain a power supply voltage value of the power supply, and store the memory voltage value and the power supply voltage value into the real-time data register corresponding to the monitoring component; and the baseboard management controller is configured to obtain the memory voltage value and the power supply voltage value from the power consumption temporary storage register, convert the memory voltage value into a memory current value corresponding to the memory voltage value, and calculate memory power consumption based on the memory current value and the power supply voltage value.

In some embodiments of the present disclosure, the component to be detected includes a central processing unit, where under the condition that an information storage unit at a front end of the central processing unit supports a power consumption reading function, the baseboard management controller is connected to the information storage unit, and is configured to read total power consumption recorded in the information storage unit; and obtain power consumption of the central processing unit by subtracting the memory power consumption from the total power consumption.

In some embodiments of the present disclosure, the component to be detected includes a central processing unit, where under the condition that an information storage unit at a front end of the central processing unit does not support a power consumption reading function, a current monitoring pin and a voltage monitoring pin of the monitoring component corresponding to the central processing unit are connected to a current detection pin of the information storage unit and a power supply pin of the central processing unit respectively, and the monitoring component corresponding to the central processing unit is configured to determine total power consumption according to an obtained current value and an obtained voltage value, and store the total power consumption into a power consumption temporary storage register corresponding to the central processing unit; and the baseboard management controller is configured to read the total power consumption recorded in the power consumption temporary storage register corresponding to the central processing unit, and obtain power consumption of the central processing unit by subtracting the memory power consumption from the total power consumption.

The embodiments of the present disclosure further provide a method for detecting power consumption of a server, including:

simultaneously transmitting a power consumption read signal to each power supply unit and each monitoring component under the condition of receiving an overall power consumption read command, so as to enable the power supply unit to copy power supply power consumption data at the current moment recorded in a real-time data register to a power consumption temporary storage register corresponding to the power supply unit and the monitoring component to copy component power consumption data at the current moment recorded in a real-time data register to a power consumption temporary storage register corresponding to the monitoring component; and reading the component power consumption data and the power supply power consumption data from the power consumption temporary storage registers.

In some embodiments of the present disclosure, simultaneously transmitting the power consumption read signal to each power supply unit and each monitoring component under the condition of receiving the overall power consumption read command includes:

simultaneously transmitting the power consumption read signal to the alarm signal pin of the power supply unit and the alarm signal pin of the monitoring component under the condition of receiving the overall power consumption read command.

In some embodiments of the present disclosure, the method further includes:

switching the baseboard management controller to a slave mode under the condition of receiving an alarm signal transmitted by the monitoring component, where the baseboard management controller stops transmitting the power consumption read signal to the monitoring component in the slave mode, and the alarm signal is an alarm signal transmitted by the monitoring component to the baseboard management controller through the alarm signal pin under the condition of detecting that the component to be detected is abnormal.

In some embodiments of the present disclosure, the method further includes:

determining a target component to be detected corresponding to the alarm signal according to the data format of the alarm signal under the condition of receiving the alarm signal transmitted by the monitoring component; and displaying prompt information of a failure of the target component to be detected through a front panel.

In some embodiments of the present disclosure, the method further includes:

converting the read component power consumption data and the read power supply power consumption data into a histogram, and displaying the histogram through a front panel, where the histogram takes a component type as a horizontal axis and power consumption as a vertical axis.

In some embodiments of the present disclosure, the method further includes:

reading the component power consumption data and the power supply power consumption data from the power consumption temporary storage registers according to a set time interval; and updating the histogram according to the currently read component power consumption data and the currently read power supply power consumption data.

In some embodiments of the present disclosure, the method further includes:

summing all the power supply power consumption data to obtain total power supply power consumption;

summing all the component power consumption data to obtain total component power consumption;

determining whether a deviation between the total power supply power consumption and the total component power consumption is less than a set threshold; and simultaneously transmitting the power consumption read signal to the power supply unit and the monitoring component under the condition that the deviation between the total power supply power consumption and the total component power consumption is greater than or equal to the set threshold.

In some embodiments of the present disclosure, the method further includes:

increasing a number of errors by one when the deviation between the total power supply power consumption and the total component power consumption is greater than or equal to the set threshold every time;

determining whether the number of errors is greater than or equal to a set error limit;

performing the step of simultaneously transmitting the power consumption read signal to the power supply unit and the monitoring component under the condition that the number of errors is less than the error limit; and displaying prompt information of abnormal power consumption through a front panel under the condition that the number of errors is greater than or equal to the error limit.

In some embodiments of the present disclosure, simultaneously transmitting the power consumption read signal to each power supply unit and each monitoring component under the condition of receiving the overall power consumption read command includes:

determining whether an alarm signal is received under the condition of receiving the overall power consumption read command; and simultaneously transmitting the power consumption read signal to the power supply unit and the monitoring component under the condition of not receiving the alarm signal.

In some embodiments of the present disclosure, the component to be detected includes a memory, and reading the component power consumption data from the power consumption temporary storage register includes:

obtaining a memory voltage value and a power supply voltage value from the power consumption temporary storage register, where the memory voltage value is a memory voltage value determined by a monitoring component that corresponds to the memory and is connected to the memory through a precision resistor and a current monitoring chip according to a resistance value of the precision resistor and a current value detected by the current monitoring chip, and the power supply voltage value is a power supply voltage value of a power supply obtained by the monitoring component that corresponds to the memory and is connected to the power supply of the memory;

converting the memory voltage value into a memory current value corresponding to the memory voltage value; and calculating memory power consumption based on the memory current value and the power supply voltage value.

In some embodiments of the present disclosure, the component to be detected includes a central processing unit, and reading the component power consumption data from the power consumption temporary storage register includes:

reading total power consumption recorded in the information storage unit under the condition that an information storage unit at a front end of the central processing unit supports a power consumption reading function; and obtaining power consumption of the central processing unit by subtracting the memory power consumption from the total power consumption.

In some embodiments of the present disclosure, the component to be detected includes a central processing unit, and reading the component power consumption data from the power consumption temporary storage register includes:

reading the total power consumption recorded in the power consumption temporary storage register corresponding to the central processing unit, where the total power consumption is total power consumption determined by a monitoring component corresponding to the CPU according to an obtained current value and an obtained voltage value, where a current monitoring pin and a voltage monitoring pin of the monitoring component corresponding to the central processing unit are connected to a current detection pin of the information storage unit and a power supply pin of the central processing unit respectively; and obtaining power consumption of the central processing unit by subtracting the memory power consumption from the total power consumption.

The embodiments of the present disclosure further provide an apparatus for detecting power consumption of a server, including a transmission unit and a reading unit, where the transmission unit is configured to simultaneously transmit a power consumption read signal to each power supply unit and each monitoring component under the condition of receiving an overall power consumption read command, so as to enable the power supply unit to copy power supply power consumption data at the current moment recorded in a real-time data register to a power consumption temporary storage register corresponding to the power supply unit and the monitoring component to copy component power consumption data at the current moment recorded in a real-time data register to a power consumption temporary storage register corresponding to the monitoring component; and the reading unit is configured to read the component power consumption data and the power supply power consumption data from the power consumption temporary storage registers.

In some embodiments of the present disclosure, the transmission unit is configured to simultaneously transmit the power consumption read signal to the alarm signal pin of the power supply unit and the alarm signal pin of the monitoring component under the condition of receiving the overall power consumption read command.

In some embodiments of the present disclosure, the apparatus further includes a switching unit, where the switching unit is configured to switch the baseboard management controller to a slave mode under the condition of receiving an alarm signal transmitted by the monitoring component, where the baseboard management controller stops transmitting the power consumption read signal to the monitoring component in the slave mode, and the alarm signal is an alarm signal transmitted by the monitoring component to the baseboard management controller through the alarm signal pin under the condition of detecting that the component to be detected is abnormal.

In some embodiments of the present disclosure, the apparatus further includes a determining unit and a displaying unit, where the determining unit is configured to determine a target component to be detected corresponding to the alarm signal according to the data format of the alarm signal under the condition of receiving the alarm signal transmitted by the monitoring component; and the displaying unit is configured to display prompt information of a failure of the target component to be detected through a front panel.

In some embodiments of the present disclosure, the apparatus further includes a conversion unit, where the conversion unit is configured to convert the read component power consumption data and the read power supply power consumption data into a histogram, and display the histogram through a front panel, where the histogram takes a component type as a horizontal axis and power consumption as a vertical axis.

In some embodiments of the present disclosure, the apparatus includes an updating unit, where the updating unit is configured to read the component power consumption data and the power supply power consumption data from the power consumption temporary storage registers according to a set time interval; and update the histogram according to the currently read component power consumption data and the currently read power supply power consumption data.

In some embodiments of the present disclosure, the apparatus further includes a summing unit and a judging unit, where the summing unit is configured to sum all the power supply power consumption data to obtain total power supply power consumption; and all the component power consumption data to obtain total component power consumption; and the judging unit is configured to determine whether a deviation between the total power supply power consumption and the total component power consumption is less than a set threshold; and trigger the transmission unit to perform the step of simultaneously transmitting the power consumption read signal to the power supply unit and the monitoring component under the condition that the deviation between the total power supply power consumption and the total component power consumption is greater than or equal to the set threshold.

In some embodiments of the present disclosure, the apparatus further includes an accumulation unit, a number judging unit and a prompt unit, where the accumulation unit is configured to increase a number of errors by one when the deviation between the total power supply power consumption and the total component power consumption is greater than or equal to the set threshold every time;

the number judging unit is configured to determine whether the number of errors is greater than or equal to a set error limit; and trigger the transmission unit to perform the step of simultaneously transmitting the power consumption read signal to the power supply unit and the monitoring component under the condition that the number of errors is less than the error limit; and the prompt unit is configured to display prompt information of abnormal power consumption through a front panel under the condition that the number of errors is greater than or equal to the error limit.

In some embodiments of the present disclosure, the transmission unit is configured to determine whether an alarm signal is received under the condition of receiving the overall power consumption read command; and simultaneously transmit the power consumption read signal to the power supply unit and the monitoring component under the condition of not receiving the alarm signal.

In some embodiments of the present disclosure, the component to be detected includes a memory, and the reading unit is configured to obtain a memory voltage value and a power supply voltage value from the power consumption temporary storage register, where the memory voltage value is a memory voltage value determined by a monitoring component that corresponds to the memory and is connected to the memory through a precision resistor and a current monitoring chip according to a resistance value of the precision resistor and a current value detected by the current monitoring chip, and the power supply voltage value is a power supply voltage value of a power supply obtained by the monitoring component that corresponds to the memory and is connected to the power supply of the memory; convert the memory voltage value into a memory current value corresponding to the memory voltage value; and calculate memory power consumption based on the memory current value and the power supply voltage value.

In some embodiments of the present disclosure, the component to be detected includes a central processing unit, and the reading unit is configured to read total power consumption recorded in the information storage unit under the condition that an information storage unit at a front end of the central processing unit supports a power consumption reading function; and obtaining power consumption of the central processing unit by subtracting the memory power consumption from the total power consumption.

In some embodiments of the present disclosure, the component to be detected includes a central processing unit, and the reading unit is configured to the total power consumption recorded in the power consumption temporary storage register corresponding to the central processing unit, where the total power consumption is total power consumption determined by a monitoring component corresponding to the CPU according to an obtained current value and an obtained voltage value, where a current monitoring pin and a voltage monitoring pin of the monitoring component corresponding to the central processing unit are connected to a current detection pin of the information storage unit and a power supply pin of the central processing unit respectively; and obtain power consumption of the central processing unit by subtracting the memory power consumption from the total power consumption.

The embodiments of the present disclosure further provide a device for detecting power consumption of a server, including:

a memory configured to store a computer program; and a processor configured to execute the computer program to implement the steps of the above method for detecting the power consumption of the server.

The embodiments of the present disclosure further provide a non-transitory readable storage medium storing a computer program, where the computer program, when executed by a processor, causes the processor to implement the steps of the above method for detecting the power consumption of the server.

As can be seen from the above technical solutions, the system for detecting power consumption of the server includes a baseboard management controller, a plurality of power supply units and one or more monitoring components corresponding to one or more components to be detected, where each of the plurality of power supply units and each of the one or more monitoring components each includes a real-time data register and a power consumption temporary storage register. The monitoring component stores collected component power consumption data of the component to be detected into the real-time data register corresponding to the monitoring component; and copies component power consumption data at a current moment recorded in the real-time data register corresponding to the monitoring component to the power consumption temporary storage register corresponding to the monitoring component under the condition of receiving a power consumption read signal transmitted by the baseboard management controller. The power supply unit stores collected power supply power consumption data into the real-time data register corresponding to the power supply unit; and copies power supply power consumption data at the current moment recorded in the real-time data register corresponding to the power supply unit to the power consumption temporary storage register corresponding to the power supply unit under the condition of receiving the power consumption read signal transmitted by the baseboard management controller. The baseboard management controller is connected to the power supply unit and the monitoring component, and is configured to simultaneously transmit the power consumption read signal to the power supply unit and the monitoring component under the condition of receiving an overall power consumption read command; and read the component power consumption data and the power supply power consumption data from the power consumption temporary storage registers. The beneficial effects of the present disclosure are that by optimizing the mode of reading power consumption of components by the baseboard management controller, the baseboard management controller may simultaneously transmit the power consumption read signal to each power supply unit and each monitoring component, thereby ensuring that the power consumption temporary storage registers record power consumption data corresponding to all power supply units and all components to be detected at the same moment, accurately showing the distribution of the overall power consumption of the server and the power consumption of the components at the current moment, improving the accuracy of reading overall power consumption values of the server, and better meeting requirements of customers for monitoring the overall power consumption of the server.

BRIEF DESCRIPTION OF THE DRAWINGS

In order to more clearly explain the technical solutions in the embodiments of the present disclosure, accompanying drawings that are required to be used in the embodiments will be briefly introduced below. Obviously, the accompanying drawings described below are merely some embodiments of the present disclosure, and a person skilled in the art may obtain other accompanying drawings according to these accompanying drawings without paying creative labor.

FIG. 3 is a histogram of a distribution of power consumption of a server provided in some embodiments of the present disclosure.

FIG. 4 is a flowchart of a method for detecting power consumption of a server provided in some embodiments of the present disclosure.

FIG. 5 is a schematic structural diagram of an apparatus for detecting power consumption of a server provided in some embodiments of the present disclosure.

DETAILED DESCRIPTION

Figure 1:
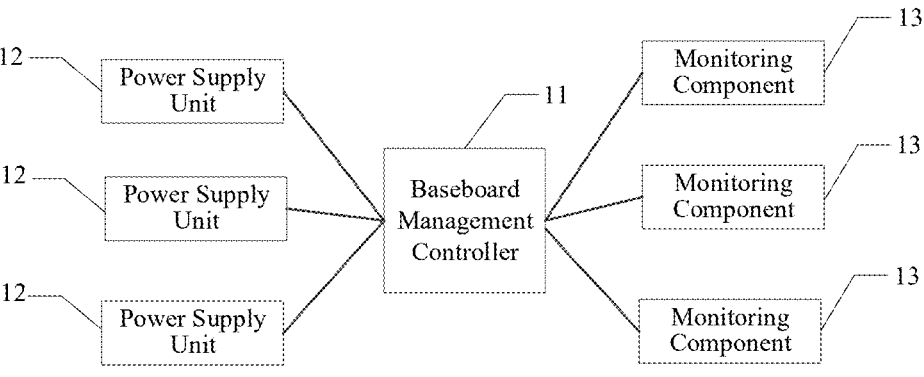
FIG. 1 is a schematic structural diagram of a system for detecting power consumption of a server provided in some embodiments of the present disclosure.

Technical solutions in some embodiments of the present disclosure will be clearly and completely described below in combination with accompanying drawings in some embodiments of the present disclosure. Obviously, the described embodiments are merely a part of the embodiments of the present disclosure, rather than all of the embodiments. All of the other embodiments that a person skilled in the art obtains on the basis of the embodiments of the present disclosure without paying creative labor fall within the protection scope of the present disclosure.

The terms "include" and "comprise" and any variations related to "include" and "comprise" in the description, claims and the above drawings of the present disclosure are intended to cover a non-exclusive inclusion. For example, a process, a method, a system, a product or an device that includes a series of steps or units is not limited to the steps or units listed, but may include steps or units not listed.

In order to make a person skilled in the art better understand the solutions of the present disclosure, the present disclosure will be further described in detail below in conjunction with the accompanying drawings and specific embodiments.

Power consumption of a server may include overall power consumption of the server and a distribution of power consumption of components. By obtaining the power consumption of each of the components, the distribution of the power consumption of the component may be obtained. The overall power consumption of the server may be determined according to power consumption of one or more power supply units (PSUs), that is, taking a sum of the power consumption of all PSUs as the overall power consumption. When research personnel need to analyze running conditions of the server at different power levels, the distribution of the power consumption of components in the server and the overall power consumption will affect the analysis conclusion.

In a traditional manner, a baseboard management controller (BMC) sends a command to read a time difference between power consumption of each PSU and power consumption of each component, which leads to the fact that the read power consumption value of each PSU and power consumption value of each component are not the power consumption at the same time, thereby affecting the analysis of the power consumption performance of the server. If the power consumption output by the PSU and the power consumption of each component at the same moment can be obtained, and the power consumption of each component can be presented intuitively, the distribution of the overall power consumption at a certain moment may be grasped, which may better meet the requirements of customers for the accuracy of power consumption monitoring.

Therefore, the present disclosure provides a system, a method, an apparatus and a device for detecting power consumption of a server, and a non-transitory readable storage medium. For each component to be detected, there is provided with a monitoring component corresponding to the component to be detected, and each power supply unit and each monitoring component each includes a real-time data register and a power consumption temporary storage register. By optimizing the mode of reading power consumption of components by the baseboard management controller, the baseboard management controller may simultaneously transmit the power consumption read signal to each power supply unit and each monitoring component, thereby ensuring that the power consumption temporary storage registers record power consumption data corresponding to all power supply units and all components to be detected at the same moment, accurately showing the distribution of the overall power consumption of the server and the power consumption of the components at the current moment.

Next, a system for detecting power consumption of a server provided in embodiments of the present disclosure is introduced in detail. FIG. 1 is a schematic structural diagram of a system for detecting power consumption of a server provided in some embodiments of the present disclosure. The system includes a baseboard management controller 11, a plurality of power supply units 12 and monitoring components 13 corresponding to components to be detected. Each of the plurality of power supply units 12 and each of the monitoring components 13 each includes a real-time data register and a power consumption temporary storage register.

The component to be detected refers to a core component included in the server, for example a central processing unit (CPU), a memory, a hard disk, a graphics processing unit (GPU), and the like. In order to realize the synchronous detecting of power consumption of each component to be detected, the monitoring component 13 may be relied on to collect power consumption data of the component to be detected in real time. Each component to be detected includes the monitoring component 13 corresponding to the component to be detected.

In FIG. 1, three power supply units 12 and three monitoring components 13 are taken as an example. In practical applications, a number of power supply units 12 and a number of monitoring components 13 can be adjusted adaptively according to a number of power supply units and types of components included in the server. The three power supply units 12 and the three monitoring components 13 in FIG. 1 are only examples.

A power consumption detection circuit is arranged inside the power supply unit 12, so as to detect power consumption of the power supply unit.

Real-time registers for storing real-time power consumption data are respectively arranged inside the power supply unit 12 and the monitoring component 13, and some blank registers are reserved for customers to customize. Since the power consumption data recorded in the real-time register is constantly updated and changed, in order to ensure that the baseboard management controller may obtain the power consumption of all power supply units 12 and the component power consumption data of all components to be detected at the same moment, a power consumption temporary storage register can be arranged to store power consumption data at the current moment.

The monitoring component 13 is configured to store collected component power consumption data of the component to be detected into the real-time data register corresponding to the monitoring component; and copy component power consumption data at a current moment recorded in the real-time data register corresponding to the monitoring component to the power consumption temporary storage register corresponding to the monitoring component under the condition of receiving a power consumption read signal transmitted by the baseboard management controller 11.

The power supply unit 12 is configured to store collected power supply power consumption data into the real-time data register corresponding to the power supply unit; and copy power supply power consumption data at the current moment recorded in the real-time data register corresponding to the power supply unit to the power consumption temporary storage register corresponding to the power supply unit under the condition of receiving the power consumption read signal transmitted by the baseboard management controller 11.

The baseboard management controller 11 is connected to the power supply unit 12 and the monitoring component 13, and is configured to simultaneously transmit the power consumption read signal to the power supply unit 12 and the monitoring component 13 under the condition of receiving an overall power consumption read command; and read the component power consumption data and the power supply power consumption data from the power consumption temporary storage registers.

In practical applications, a schematic diagram of a power consumption information panel can be added in a front page (Web) of the baseboard management controller 11. When a customer opens a power consumption information menu and selects to obtain power consumption information, the customer can click "read". At this time, it is equivalent to inputting an overall power consumption read command to the baseboard management controller 11, and correspondingly, the baseboard management controller 11 simultaneously transmits the power consumption read signal to the power supply units 12 and the monitoring components 13.

In practical applications, a number of power consumption temporary storage registers may be one. The power supply unit 12 and the monitoring component 13 each corresponds to a same power consumption temporary storage register. The power consumption temporary storage register is a register arranged independently, and the real-time data register embedded in the power supply unit 12 and the real-time data register embedded in the monitoring component 13 are both connected to the power consumption temporary storage register. Power consumption data recorded in different real-time data registers can carry component identifiers corresponding to the different real-time data registers, so that the baseboard management controller 11 may distinguish which component or power supply unit 12 each power consumption corresponds to according to the component identifiers carried in each power consumption data after reading power consumption data from the power consumption temporary storage register.

In addition to setting a common power consumption temporary storage register, the number of power consumption temporary storage registers may also be plural. For example, the power supply unit 12 and the monitoring component 13 each corresponds to one power consumption temporary storage register.

The power consumption temporary storage register may be registers customized based on a blank register embedded in the power supply unit 12 and a blank register embedded in the monitoring component 13. That is, the blank register embedded in the power supply unit 12 can be customized as the power consumption temporary storage register, and the blank register embedded in the monitoring component 13 can be customized as the power consumption temporary storage register.

In embodiments of the present disclosure, the baseboard management controller 11 may be respectively connected to the power consumption temporary storage register embedded in the monitoring component 13 and the power consumption temporary storage register embedded in the power supply unit 12 through a communication bus, that is, a serial bus (for example, I2C bus), and may be configured to obtain the component power consumption data and the power supply power consumption data recorded in the power consumption temporary storage registers.

In embodiments of the present disclosure, the CPU and the memory read the power consumption in the same way as other components, instead of obtaining the power consumption from the ME of the PCH by the BMC. The power consumption data is read from the power consumption temporary storage register through the serial bus, which ensures the universality of the solution, and is suitable for Intel and advanced micro devices (AMD) platforms, which is not limited by the type of CPU.

A server may include a plurality of power supply units 12, and a sum of power consumption of all the power supply units 12 can be used as the over power consumption of the server. The server includes a plurality of core components, and the power consumption of each of these core components reflects a distribution of the power consumption of the server.

Figure 2:
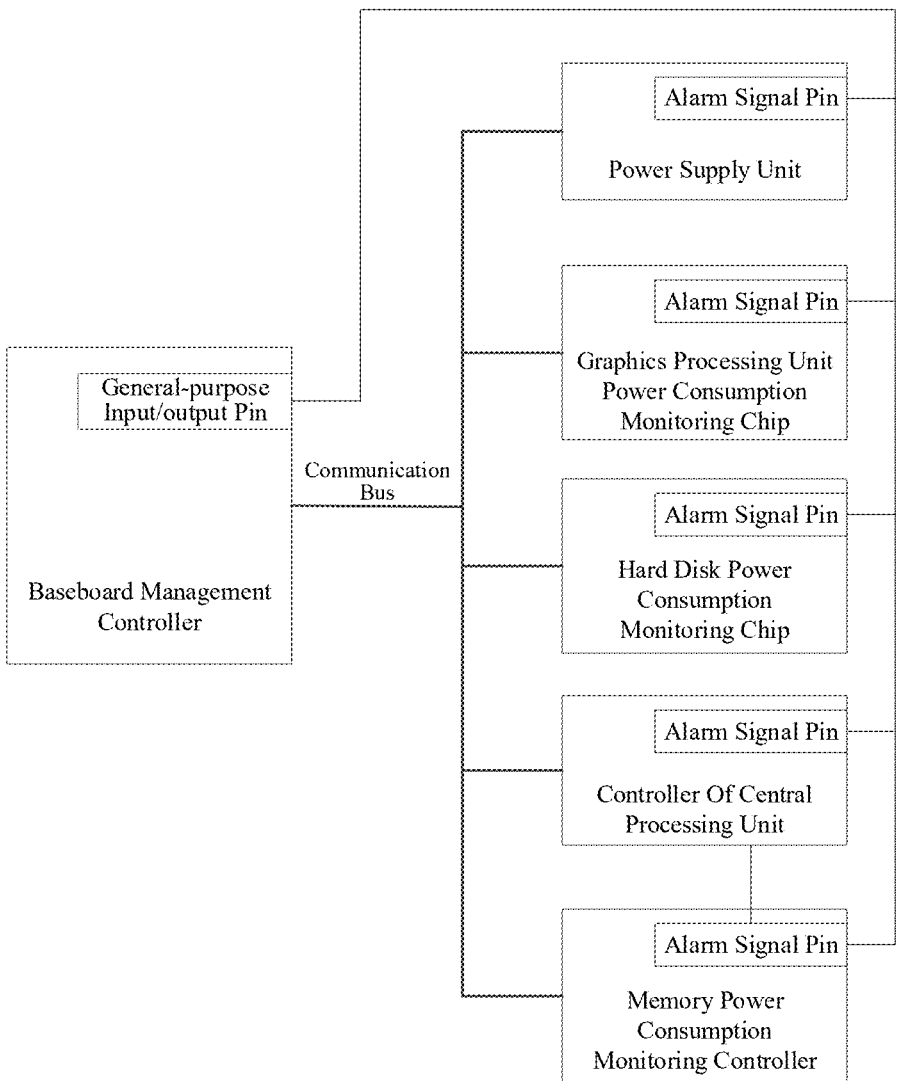
FIG. 2 is a logical block diagram of obtaining overall power consumption provided in some embodiments of the present disclosure.

FIG. 2 is a logical block diagram of obtaining overall power consumption provided in some embodiments of the present disclosure. Considering that the interaction between each power supply unit and the baseboard management controller is similar, one power supply unit and components to be detected such as a graphics processing unit (GPU), a hard disk, a central processing unit (CPU), and a memory are taken as an example in FIG. 2. A monitoring component 13 corresponding to the GPU may be a graphics processing unit power consumption monitoring chip, that is, a GPU power consumption monitoring chip, a monitoring component 13 corresponding to the hard disk may be a hard disk power consumption monitoring chip, a monitoring component 13 corresponding to the CPU may be a controller of the central processing unit, that is, a CPU controller, and a monitoring component 13 corresponding to the memory may be a memory power consumption monitoring controller.

A general-purpose input/output (GPIO) pin of the baseboard management controller 11 is connected in series to an alarm signal pin (ALERT) of each power supply unit 12 and an alarm signal pin of each monitoring component 13. The alarm signal pin may be a bidirectional port pin supporting input and output.

The baseboard management controller 11 simultaneously transmits the power consumption read signal to the alarm signal pin of the power supply unit 12 and the alarm signal pin of the monitoring component 13 under the condition of receiving the overall power consumption read command.

The baseboard management controller 11 may be connected to the power consumption temporary storage register embedded in each monitoring component 13 and the power consumption temporary storage register embedded in each power supply unit 12 through the serial bus, so as to obtain the power consumption data at the same moment.

In embodiments of the present disclosure, by modifying a pin attribute program (Firmware, FW) at the bottom of an integrated circuit (IC) chip, the ALERT can be defined as a bidirectional port, and a new function can be given to an ALERT signal pin, so that each monitoring component 13 can receive information sent by the baseboard management controller 11 through the ALERT, and can also upload information to the baseboard management controller 11 through the ALERT.

ALERTs of all the power consumption monitoring chips and ALERTs of all the power supply units are connected in series through a GPIO port of the baseboard management control 11. A signal of the GPIO port is used as an indication signal, and is connected to ALERT pins of the power consumption monitoring chips and ALERT pins of the power supply units.

In practical applications, the monitoring component 13 can transmit an alarm signal to the baseboard management controller 11 through the alarm signal pin under the condition that it is detected that an abnormality occurs in the component to be detected.

Correspondingly, the baseboard management controller 11 may switch the baseboard management controller to a slave mode under the condition of receiving the alarm signal transmitted by the monitoring component 13, where the baseboard management controller 11 stops transmitting the power consumption read signal to the monitoring component 13 in the slave mode.

Since the ALERT is defined as the bidirectional port supporting input and output at the same time, in order to avoid the master-slave conflict between two devices, the baseboard management controller 11 is set as a master device by default, and each power supply unit 12 and each monitoring component 13 are set as slave devices.

In practical applications, data transmitted by each power supply unit 12 and each monitoring component 13 can be set as high priority. When each power supply unit 12 and each monitoring component 13 detect abnormal information, a 4-bit low level 0000 can be sent. When the 4-bit low level is detected, the baseboard management controller 11 actively sets itself to the slave mode, that is, the baseboard management controller 11 acts as a slave, and receives the data transmitted from the power supply unit 12 or the monitoring component 13.

In the above description, the baseboard management controller 11 is switched to the slave mode based on the 4-bit low level 0000 sent by the monitoring component 13. In addition to realizing the switching from a master mode to the slave mode based on the low level alarm signal, the monitoring component 13 can also send alarm signals with different formats to realize the purpose of transmitting information to the baseboard management controller 11.

In practical applications, the ALERT signal is high by default. When the monitoring component 13 detects abnormal information such as overcurrent and overvoltage, the monitoring component 13 can send a set of high and low levels of fixed data through the ALERT pin, for example, "high low high low high low high low" (referred to as the alarm signal), and a duration of each level is 1 ms. It is set in the BMC that when a high level is received, it is determined as 1; and when a low level is received, it is determined as 0. If it is determined once ever 1 ms, the received data will be determined as "10101010", which is referred to as an "ALERT" alarm signal.

In embodiments of the present disclosure, in order to facilitate the baseboard management controller 11 to distinguish the components corresponding to the alarm signals, different data formats can be set for different device types.

The monitoring component 13 may obtain a device type of the component to be detected monitored by the monitoring component 13; and generate the alarm signal according to a data format matched with the device type.

For example, an alarm signal adopted by the monitoring component 13 of the fan may be 11001100, and an alarm signal adopted by the monitoring component 13 of the memory may be 10010010.

The baseboard management controller 11 may determine a target component to be detected corresponding to the alarm signal according to the data format of the alarm signal under the condition of receiving the alarm signal transmitted by the monitoring component 13. In order to facilitate management personnel to know a running condition of each component in the server in time, prompt information of a failure of the target component to be detected may be displayed through a front panel.

In embodiments of the present disclosure, after copying the component power consumption data at the current moment recorded in the real-time data register corresponding to the monitoring component to the power consumption temporary storage register corresponding to the monitoring component, the monitoring component 13 may clear the power consumption temporary storage register corresponding to the monitoring component according to a set time interval, and copy the component power consumption data at the current moment recorded in the real-time data register corresponding to the monitoring component to the power consumption temporary storage register corresponding to the monitoring component.

A value of the time interval may be flexibly set according to actual needs, for example, the time interval may be set to 20 seconds (s).

After the monitoring component 13 copies the power consumption data in the real-time data register to the power consumption temporary storage register, and the baseboard management controller 11 reads all the power consumption data from the power consumption temporary storage register, the monitoring component 13 automatically clears data in the power consumption temporary storage register at a time interval of 20 seconds, and then copies power consumption data corresponding to the current moment in the real-time data register to the power consumption temporary storage register again, and the above operations are circulated.

For example, the power consumption monitoring chip and PSU use the existing ALERT signal to define ALERT as the bidirectional port supporting input and output at the same time by modifying the FW at the bottom of the chip, and newly define a power consumption temporary storage register from a blank register. A GPIO port of the BMC connects all ALERT signals. Under normal circumstances, the ALERT signal is high. When receiving an overall power consumption read command, the BMC can send out an 8-bit fixed data. After receiving this data, the monitoring component corresponding to each component to be detected and the ALERT pin of the PSU copy the data in the real-time data register to the power consumption temporary storage register, and then the BMC sequentially reads the power consumption of the core components such as the PSU and the CPU. When the power consumption is completely read, each monitoring component and the PSU will start timing, and the data in the real-time data register will be copied to the power consumption temporary storage register every 20 s to overwrite original data.

The foregoing takes the monitoring component 13 as an example to introduce the implementation of recording data by the monitoring component 13 into the power consumption temporary storage register, and the implementation of recording data by the power supply unit 12 into the power consumption temporary storage register is similar with the foregoing implementation, which will not be described in detail here.

Considering that in practical applications, the baseboard management controller 11 may need to reacquire the power consumption data before reaching the set time interval, after the monitoring component 13 copies the component power consumption data at the current moment recorded in the real-time data register corresponding to the monitoring component 13 to the power consumption temporary storage register corresponding to the monitoring component 13, and the monitoring component 13 receives the power consumption read signal transmitted by the baseboard management controller 11 again, the monitoring component 13 clear the power consumption temporary storage register corresponding to the monitoring component 13 and copy the current power consumption data recorded in the real-time data register corresponding to the monitoring component 13 to the power consumption temporary storage register.

For example, assuming that after the monitoring component 13 copies the power consumption data in the real-time data register to the power consumption temporary storage register, and the baseboard management controller 11 reads all the power consumption data from the power consumption temporary storage register, the monitoring component 13 starts timing. When the timer reaches the 10th time, the monitoring component 13 receives the power consumption read signal transmitted by the baseboard management controller 11 again, the monitoring component 13 can automatically clear the data in the power consumption temporary storage register, and copy power consumption data at the 10th second recorded in the real-time data register to the power consumption temporary storage register again, so as to ensure that the baseboard management controller 11 may obtain power consumption data corresponding to the current moment.

In order to facilitate management personnel to intuitively understand the power consumption of different components, the baseboard management controller 11 may convert the read component power consumption data and the read power supply power consumption data into a histogram, and display the histogram through a front panel. The histogram takes a component type as a horizontal axis and power consumption as a vertical axis.

FIG. 3 is a histogram of a distribution of power consumption of a server provided in some embodiments of the present disclosure. The horizontal axis in the histogram corresponds to different components. In FIG. 3, a power supply unit (PSU), a central processing unit (CPU), a memory, a fan, a hard disk, and a graphics processing unit (GPU) are taken as examples. The vertical axis in FIG. 3 is power consumption values corresponding to the different components. For example, a power consumption value of the PSU is 2000, a power consumption value of the CPU is 700, a power consumption value of the memory is 60, a power consumption value of the fan is 300, a power consumption value of the hard disk is 440, and a power consumption value of the GPU is 500.

It should be noted that in the embodiments of the present disclosure, the component types included in the histogram are not limited, and FIG. 3 is only an example. In practical applications, the component types included in the histogram can include all core components, or components selected by a user to be displayed in the histogram.

In practical applications, in order to ensure the validity of the histogram, the baseboard management controller 11 may read the component power consumption data and the power supply power consumption data from the power consumption temporary storage registers according to a set time interval; and update the histogram according to the currently read component power consumption data and the currently read power supply power consumption data.

By displaying the power consumption values corresponding to different components on the front panel in the form of histogram, it is convenient for operators to quickly and intuitively understand the distribution of the power consumption of various components in the server.

In practical applications, when the obtained power consumption of all the power supply units 12 and the obtained component power consumption of all the components to be detected are power consumption at the same time, a sum of the power consumption of all the power supply units 12 is the same as or close to a sum of the component power consumption of all the components to be detected.

Therefore, in the embodiments of the present disclosure, the baseboard management controller 11 may sum all the power supply power consumption data to obtain total power supply power consumption; sum all the component power consumption data to obtain total component power consumption; and determine whether a deviation between the total power supply power consumption and the total component power consumption is less than a set threshold.

A value of the threshold can be set according to actual needs. The stricter the time accuracy of power consumption data is, the smaller the threshold value can be.

When a deviation between the total power supply power consumption and the total component power consumption is greater than or equal to the set threshold, it means that the power supply power consumption and the component power consumption obtained at this time do not belong to the same moment, and thus the baseboard management controller 11 may reacquire the power consumption data, that is, transmit the power consumption read signal to the power supply unit 12 and the monitoring component 13 at the same time again.

When the deviation between the total power supply power consumption and the total component power consumption is greater than or equal to the set threshold every time, the baseboard management controller 11 may increase a number of errors by one, and determine whether the number of errors is greater than or equal to a set error limit.

When the number of errors is less than the error limit, the baseboard management controller 11 may reacquire power consumption data, that is, perform the step of simultaneously transmitting the power consumption read signal to each power supply unit 12 and each monitoring component 13.

When the number of errors is greater than or equal to the error limit, it means that the baseboard management controller 11 is unable to obtain all the power consumption data at the same moment by transmitting the power consumption read signal for many times, and prompt information of abnormal power consumption can be displayed through a front panel at this time.

By comparing the total power supply power consumption of all the power supply units with the total component power consumption of all the components to be detected, it can be identified whether all the currently obtained power consumption data belongs to power consumption data at the same moment. Under the condition that the deviation between the total power supply power consumption of all the power supply units and the total component power consumption of all the components to be detected is relatively small, it means that all the currently obtained power consumption data belongs to the power consumption data at the same moment; under the condition that the deviation between the total power supply power consumption of all the power supply units and the total component power consumption of all the components to be detected is relatively large, the power consumption data can be reacquired; and under the condition that all power consumption data at the same moment cannot be obtained for many times, prompt information of abnormal power consumption is displayed through the front panel, which is convenient for management personnel to detect the power consumption of each component of the server in time, thereby ensuring normal operation of each component and improving the operation stability of the server.

In practical applications, during the acquisition of power consumption data by the baseboard management controller 11, there may be one or more abnormal components to be detected. When one or more components to be detected are abnormal, one or more monitoring components 13 will feed back an alarm signal to the baseboard management controller.

Therefore, the baseboard management controller 11 may determine whether an alarm signal is received under the condition of receiving the overall power consumption read command; and simultaneously transmit the power consumption read signal to the power supply unit 12 and the monitoring component 13 under the condition of not receiving the alarm signal.

The monitoring component 13 may determine whether there is an unrecognizable data format under the condition of receiving the power consumption read signal transmitted by the baseboard management controller 11. Under the condition that there is the unrecognizable data format, it means that a component to be detected is abnormal, and the alarm signal may be transmitted to the baseboard management controller 11; and under the condition that there is no unrecognizable data format, the monitoring component 13 performs the step of copying component power consumption data at a current moment recorded in the real-time data register corresponding to the monitoring component to the power consumption temporary storage register corresponding to the monitoring component.

For example, if the component to be detected is abnormal, the ALERT signal will actively transmit an alarm data signal to the BMC to inform the abnormality. If the component to be detected is abnormal while the BMC transmits the power consumption read signal, data conflict may occur. If unrecognizable data or the alarm signal ALERT is detected, it is uniformly determined as chip abnormality and related alarms are recorded.

There are various types of components to be detected. Taking that the component to be detected is a memory as an example. In practical applications, the monitoring component 13 corresponding to the memory can be connected to the memory through a precision resistor and a current monitoring chip; and is configured to determine a memory voltage value corresponding to the memory according to a resistance value of the precision resistor and a current value detected by the current monitoring chip.

The monitoring component 13 corresponding to the memory is connected to a power supply of the memory, and is configured to obtain a power supply voltage value of the power supply, and store the memory voltage value and the power supply voltage value into the real-time data register corresponding to the monitoring component. The baseboard management controller 11 is configured to obtain the memory voltage value and the power supply voltage value from the power consumption temporary storage register, convert the memory voltage value into a memory current value corresponding to the memory voltage value, and calculate memory power consumption based on the memory current value and the power supply voltage value.

The server usually includes a plurality of CPUs, and each of the plurality of CPUs has a controller corresponding to the CPU. The controller may be used to detect the power consumption of the CPU and the memory.

For the power consumption of the memory, in the embodiments of the present disclosure, by adding the precision resistor and the current monitoring chip, current information of the memory is converted into voltage information and is sent to any controller of the CPU together with related power supply information. The baseboard management controller 11 reads the power consumption temporary storage register in the controller to obtain memory power consumption.

Taking the central processing unit as an example, under the condition that an information storage unit at a front end of the central processing unit supports a power consumption reading function, the baseboard management controller 11 is connected to the information storage unit, and is configured to read total power consumption recorded in the information storage unit; and obtain power consumption of the central processing unit by subtracting the memory power consumption from the total power consumption.

For example, in practical applications, if the information storage unit (EFUSE) at the front end of the CPU supports power consumption reading, the BMC can directly obtain current total power consumption of the CPU and the memory through the EFUSE, and then subtract the power consumption of the memory to obtain the power consumption of a single CPU.

Under the condition that an information storage unit at a front end of the central processing unit does not support a power consumption reading function, a current monitoring pin and a voltage monitoring pin of the monitoring component 13 corresponding to the central processing unit are connected to a current detection pin of the information storage unit and a power supply pin of the central processing unit respectively, and the monitoring component corresponding to the central processing unit is configured to determine total power consumption according to an obtained current value and an obtained voltage value, and store the total power consumption into a power consumption temporary storage register corresponding to the central processing unit; and the baseboard management controller 11 is configured to read the total power consumption recorded in the power consumption temporary storage register corresponding to the central processing unit, and obtain power consumption of the central processing unit by subtracting the memory power consumption from the total power consumption.

For example, if the EFUSE at the front end of the CPU does not support power consumption reading, a current detection pin of the EFUSE and a related power supply are connected to the current monitoring pin and the voltage monitoring pin of any controller of the CPU. The BMC accesses a power consumption temporary storage register of the controller to obtain power consumption of the CPU and the memory, and then obtains the power consumption of a single CPU by subtracting the power consumption of the memory.

As can be seen from the above technical solutions, the system for detecting power consumption of the server includes a baseboard management controller, a plurality of power supply units and one or more monitoring components corresponding to one or more components to be detected, where each of the plurality of power supply units and each of the one or more monitoring components each includes a real-time data register and a power consumption temporary storage register. The monitoring component stores collected component power consumption data of the component to be detected into the real-time data register corresponding to the monitoring component; and copies component power consumption data at a current moment recorded in the real-time data register corresponding to the monitoring component to the power consumption temporary storage register corresponding to the monitoring component under the condition of receiving a power consumption read signal transmitted by the baseboard management controller. The power supply unit stores collected power supply power consumption data into the real-time data register corresponding to the power supply unit; and copies power supply power consumption data at the current moment recorded in the real-time data register corresponding to the power supply unit to the power consumption temporary storage register corresponding to the power supply unit under the condition of receiving the power consumption read signal transmitted by the baseboard management controller. The baseboard management controller is connected to the power supply unit and the monitoring component, and is configured to simultaneously transmit the power consumption read signal to the power supply unit and the monitoring component under the condition of receiving an overall power consumption read command; and read the component power consumption data and the power supply power consumption data from the power consumption temporary storage registers. The beneficial effects of the present disclosure are that by optimizing the mode of reading power consumption of components by the baseboard management controller, the baseboard management controller may simultaneously transmit the power consumption read signal to each power supply unit and each monitoring component, thereby ensuring that the power consumption temporary storage registers record power consumption data corresponding to all power supply units and all components to be detected at the same moment, accurately showing the distribution of the overall power consumption of the server and the power consumption of the components at the current moment, improving the accuracy of reading overall power consumption values of the server, and better meeting requirements of customers for the overall power consumption monitoring of the server.

FIG. 4 is a flowchart of a method for detecting power consumption of a server provided in some embodiments of the present disclosure. The method includes:

S401, a power consumption read signal is simultaneously transmitted to each power supply unit and each monitoring component under the condition of receiving an overall power consumption read command, so as to enable the power supply unit to copy power supply power consumption data at the current moment recorded in a real-time data register to a power consumption temporary storage register corresponding to the power supply unit and the monitoring component to copy component power consumption data at the current moment recorded in a real-time data register to a power consumption temporary storage register corresponding to the monitoring component; and S402, the component power consumption data and the power supply power consumption data are read from the power consumption temporary storage registers.

In some embodiments, simultaneously transmitting the power consumption read signal to each power supply unit and each monitoring component under the condition of receiving the overall power consumption read command includes:

simultaneously transmitting the power consumption read signal to the alarm signal pin of the power supply unit and the alarm signal pin of the monitoring component under the condition of receiving the overall power consumption read command.

In some embodiments, the method further includes:

switching the baseboard management controller to a slave mode under the condition of receiving an alarm signal transmitted by the monitoring component, where the baseboard management controller stops transmitting the power consumption read signal to the monitoring component in the slave mode, and the alarm signal is an alarm signal transmitted by the monitoring component to the baseboard management controller through the alarm signal pin under the condition of detecting that the component to be detected is abnormal.

In some embodiments, the method further includes:

determining a target component to be detected corresponding to the alarm signal according to the data format of the alarm signal under the condition of receiving the alarm signal transmitted by the monitoring component; and displaying prompt information of a failure of the target component to be detected through a front panel.

In some embodiments, the method further includes:

converting the read component power consumption data and the read power supply power consumption data into a histogram, and displaying the histogram through a front panel, where the histogram takes a component type as a horizontal axis and power consumption as a vertical axis.

In some embodiments, the method further includes:

reading the component power consumption data and the power supply power consumption data from the power consumption temporary storage registers according to a set time interval; and updating the histogram according to the currently read component power consumption data and the currently read power supply power consumption data.

In some embodiments, the method further includes:

summing all the power supply power consumption data to obtain total power supply power consumption;

summing all the component power consumption data to obtain total component power consumption;

determining whether a deviation between the total power supply power consumption and the total component power consumption is less than a set threshold; and simultaneously transmitting the power consumption read signal to the power supply unit and the monitoring component under the condition that the deviation between the total power supply power consumption and the total component power consumption is greater than or equal to the set threshold.

In some embodiments, the method further includes:

increasing a number of errors by one when the deviation between the total power supply power consumption and the total component power consumption is greater than or equal to the set threshold every time;

determining whether the number of errors is greater than or equal to a set error limit;

performing the step of simultaneously transmitting the power consumption read signal to the power supply unit and the monitoring component under the condition that the number of errors is less than the error limit; and displaying prompt information of abnormal power consumption through a front panel under the condition that the number of errors is greater than or equal to the error limit.

In some embodiments, simultaneously transmitting the power consumption read signal to each power supply unit and each monitoring component under the condition of receiving the overall power consumption read command includes:

determining whether an alarm signal is received under the condition of receiving the overall power consumption read command; and simultaneously transmitting the power consumption read signal to the power supply unit and the monitoring component under the condition of not receiving the alarm signal.

In some embodiments, the component to be detected includes a memory, and reading the component power consumption data from the power consumption temporary storage register includes:

obtaining a memory voltage value and a power supply voltage value from the power consumption temporary storage register, where the memory voltage value is a memory voltage value determined by a monitoring component that corresponds to the memory and is connected to the memory through a precision resistor and a current monitoring chip according to a resistance value of the precision resistor and a current value detected by the current monitoring chip, and the power supply voltage value is a power supply voltage value of a power supply obtained by the monitoring component that corresponds to the memory and is connected to the power supply of the memory;

converting the memory voltage value into a memory current value corresponding to the memory voltage value; and calculating memory power consumption based on the memory current value and the power supply voltage value.

In some embodiments, the component to be detected includes a central processing unit, and reading the component power consumption data from the power consumption temporary storage register includes:

reading total power consumption recorded in the information storage unit under the condition that an information storage unit at a front end of the central processing unit supports a power consumption reading function; and obtaining power consumption of the central processing unit by subtracting the memory power consumption from the total power consumption.

In some embodiments, the component to be detected includes a central processing unit, and reading the component power consumption data from the power consumption temporary storage register includes:

reading the total power consumption recorded in the power consumption temporary storage register corresponding to the central processing unit, where the total power consumption is total power consumption determined by a monitoring component corresponding to the CPU according to an obtained current value and an obtained voltage value, where a current monitoring pin and a voltage monitoring pin of the monitoring component corresponding to the central processing unit are connected to a current detection pin of the information storage unit and a power supply pin of the central processing unit respectively; and obtaining power consumption of the central processing unit by subtracting the memory power consumption from the total power consumption.

The description of features in the embodiments corresponding to FIG. 4 may be referred to the related description of the embodiments corresponding to FIG. 1, which will not be repeated here.

As can be seen from the above technical solutions, the system for detecting power consumption of the server includes a baseboard management controller, a plurality of power supply units and one or more monitoring components corresponding to one or more components to be detected, where each of the plurality of power supply units and each of the one or more monitoring components each includes a real-time data register and a power consumption temporary storage register. The monitoring component stores collected component power consumption data of the component to be detected into the real-time data register corresponding to the monitoring component; and copies component power consumption data at a current moment recorded in the real-time data register corresponding to the monitoring component to the power consumption temporary storage register corresponding to the monitoring component under the condition of receiving a power consumption read signal transmitted by the baseboard management controller. The power supply unit stores collected power supply power consumption data into the real-time data register corresponding to the power supply unit; and copies power supply power consumption data at the current moment recorded in the real-time data register corresponding to the power supply unit to the power consumption temporary storage register corresponding to the power supply unit under the condition of receiving the power consumption read signal transmitted by the baseboard management controller. The baseboard management controller is connected to the power supply unit and the monitoring component, and is configured to simultaneously transmit the power consumption read signal to the power supply unit and the monitoring component under the condition of receiving an overall power consumption read command; and read the component power consumption data and the power supply power consumption data from the power consumption temporary storage registers. The beneficial effects of the present disclosure are that by optimizing the mode of reading power consumption of components by the baseboard management controller, the baseboard management controller may simultaneously transmit the power consumption read signal to each power supply unit and each monitoring component, thereby ensuring that the power consumption temporary storage registers record power consumption data corresponding to all power supply units and all components to be detected at the same moment, accurately showing the distribution of the overall power consumption of the server and the power consumption of the components at the current moment, improving the accuracy of reading overall power consumption values of the server, and better meeting requirements of customers for the overall power consumption monitoring of the server.

FIG. 5 is a schematic structural diagram of an apparatus for detecting power consumption of a server provided in some embodiments of the present disclosure. The apparatus includes a transmission unit 51 and a reading unit 52.

The transmission unit 51 is configured to simultaneously transmit a power consumption read signal to each power supply unit and each monitoring component under the condition of receiving an overall power consumption read command, so as to enable the power supply unit to copy power supply power consumption data at the current moment recorded in a real-time data register to a power consumption temporary storage register corresponding to the power supply unit and the monitoring component to copy component power consumption data at the current moment recorded in a real-time data register to a power consumption temporary storage register corresponding to the monitoring component.

The reading unit 52 is configured to read the component power consumption data and the power supply power consumption data from the power consumption temporary storage registers.

In some embodiments, the transmission unit is configured to simultaneously transmit the power consumption read signal to the alarm signal pin of the power supply unit and the alarm signal pin of the monitoring component under the condition of receiving the overall power consumption read command.

In some embodiments, the apparatus further includes a switching unit, where the switching unit is configured to switch the baseboard management controller to a slave mode under the condition of receiving an alarm signal transmitted by the monitoring component, where the baseboard management controller stops transmitting the power consumption read signal to the monitoring component in the slave mode, and the alarm signal is an alarm signal transmitted by the monitoring component to the baseboard management controller through the alarm signal pin under the condition of detecting that the component to be detected is abnormal.

In some embodiments, the apparatus further includes a determining unit and a displaying unit, where the determining unit is configured to determine a target component to be detected corresponding to the alarm signal according to the data format of the alarm signal under the condition of receiving the alarm signal transmitted by the monitoring component; and the displaying unit is configured to display prompt information of a failure of the target component to be detected through a front panel.

In some embodiments, the apparatus further includes a conversion unit, where the conversion unit is configured to convert the read component power consumption data and the read power supply power consumption data into a histogram, and display the histogram through a front panel, where the histogram takes a component type as a horizontal axis and power consumption as a vertical axis.

In some embodiments, the apparatus includes an updating unit, where the updating unit is configured to read the component power consumption data and the power supply power consumption data from the power consumption temporary storage registers according to a set time interval; and update the histogram according to the currently read component power consumption data and the currently read power supply power consumption data.

In some embodiments, the apparatus further includes a summing unit and a judging unit, where the summing unit is configured to sum all the power supply power consumption data to obtain total power supply power consumption; and all the component power consumption data to obtain total component power consumption; and the judging unit is configured to determine whether a deviation between the total power supply power consumption and the total component power consumption is less than a set threshold; and trigger the transmission unit to perform the step of simultaneously transmitting the power consumption read signal to the power supply unit and the monitoring component under the condition that the deviation between the total power supply power consumption and the total component power consumption is greater than or equal to the set threshold.

In some embodiments, the apparatus further includes an accumulation unit, a number judging unit and a prompt unit, where the accumulation unit is configured to increase a number of errors by one when the deviation between the total power supply power consumption and the total component power consumption is greater than or equal to the set threshold every time;

the number judging unit is configured to determine whether the number of errors is greater than or equal to a set error limit; and trigger the transmission unit to perform the step of simultaneously transmitting the power consumption read signal to the power supply unit and the monitoring component under the condition that the number of errors is less than the error limit; and the prompt unit is configured to display prompt information of abnormal power consumption through a front panel under the condition that the number of errors is greater than or equal to the error limit.

In some embodiments, the transmission unit is configured to determine whether an alarm signal is received under the condition of receiving the overall power consumption read command; and simultaneously transmit the power consumption read signal to the power supply unit and the monitoring component under the condition of not receiving the alarm signal.

In some embodiments, the component to be detected includes a memory, and the reading unit is configured to obtain a memory voltage value and a power supply voltage value from the power consumption temporary storage register, where the memory voltage value is a memory voltage value determined by a monitoring component that corresponds to the memory and is connected to the memory through a precision resistor and a current monitoring chip according to a resistance value of the precision resistor and a current value detected by the current monitoring chip, and the power supply voltage value is a power supply voltage value of a power supply obtained by the monitoring component that corresponds to the memory and is connected to the power supply of the memory; convert the memory voltage value into a memory current value corresponding to the memory voltage value; and calculate memory power consumption based on the memory current value and the power supply voltage value.

In some embodiments, the component to be detected includes a central processing unit, and the reading unit is configured to read total power consumption recorded in the information storage unit under the condition that an information storage unit at a front end of the central processing unit supports a power consumption reading function; and obtaining power consumption of the central processing unit by subtracting the memory power consumption from the total power consumption.

In some embodiments, the component to be detected includes a central processing unit, and the reading unit is configured to the total power consumption recorded in the power consumption temporary storage register corresponding to the central processing unit, where the total power consumption is total power consumption determined by a monitoring component corresponding to the CPU according to an obtained current value and an obtained voltage value, where a current monitoring pin and a voltage monitoring pin of the monitoring component corresponding to the central processing unit are connected to a current detection pin of the information storage unit and a power supply pin of the central processing unit respectively; and obtain power consumption of the central processing unit by subtracting the memory power consumption from the total power consumption.

The description of features in the embodiments corresponding to FIG. 5 may be referred to the related description of the embodiments corresponding to FIG. 1, which will not be repeated here.

As can be seen from the above technical solutions, the system for detecting power consumption of the server includes a baseboard management controller, a plurality of power supply units and one or more monitoring components corresponding to one or more components to be detected, where each of the plurality of power supply units and each of the one or more monitoring components each includes a real-time data register and a power consumption temporary storage register. The monitoring component stores collected component power consumption data of the component to be detected into the real-time data register corresponding to the monitoring component; and copies component power consumption data at a current moment recorded in the real-time data register corresponding to the monitoring component to the power consumption temporary storage register corresponding to the monitoring component under the condition of receiving a power consumption read signal transmitted by the baseboard management controller. The power supply unit stores collected power supply power consumption data into the real-time data register corresponding to the power supply unit; and copies power supply power consumption data at the current moment recorded in the real-time data register corresponding to the power supply unit to the power consumption temporary storage register corresponding to the power supply unit under the condition of receiving the power consumption read signal transmitted by the baseboard management controller. The baseboard management controller is connected to the power supply unit and the monitoring component, and is configured to simultaneously transmit the power consumption read signal to the power supply unit and the monitoring component under the condition of receiving an overall power consumption read command; and read the component power consumption data and the power supply power consumption data from the power consumption temporary storage registers. The beneficial effects of the present disclosure are that by optimizing the mode of reading power consumption of components by the baseboard management controller, the baseboard management controller may simultaneously transmit the power consumption read signal to each power supply unit and each monitoring component, thereby ensuring that the power consumption temporary storage registers record power consumption data corresponding to all power supply units and all components to be detected at the same moment, accurately showing the distribution of the overall power consumption of the server and the power consumption of the components at the current moment, improving the accuracy of reading overall power consumption values of the server, and better meeting requirements of customers for the overall power consumption monitoring of the server.

Figure 6:
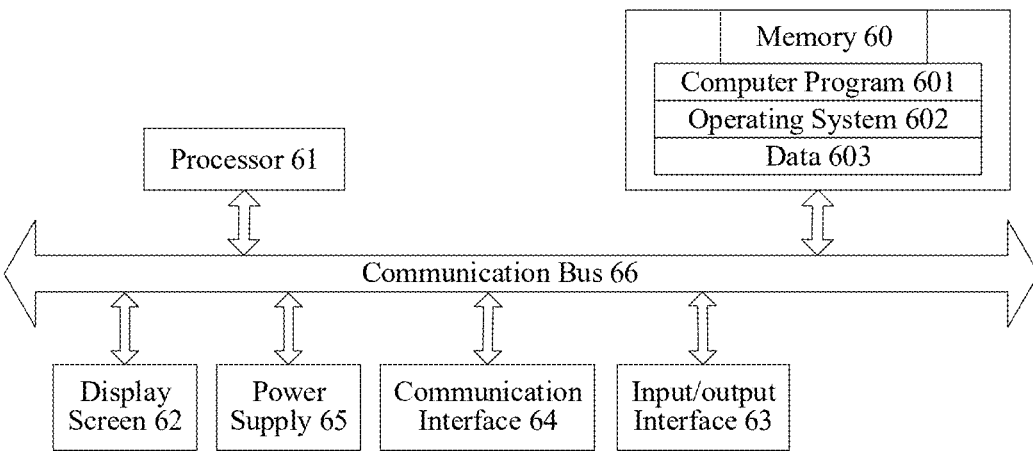
FIG. 6 is a structural diagram of a device for detecting power consumption of a server provided in some embodiments of the present disclosure.

FIG. 6 is a structural diagram of a device for detecting power consumption of a server provided in some embodiments of the present disclosure. As shown in FIG. 6, the device for detecting power consumption of the server includes a memory 60 configured to store a computer program; and a processor 61 configured to execute the computer program to implement the steps of the method for detecting the power consumption of the server in the above embodiments.

The device for detecting power consumption of a server provided in the embodiments may include, but is not limited to, a smartphone, a tablet computer, a notebook computer, a desktop computer, or the like.

The processor 61 may include one or more processing cores such as a 4-core processor and an 8-core processor. The processor 61 may be implemented in at least one hardware form of a digital signal processing (DSP), a field-programmable gate array (FPGA), and a programmable logic array (PLA). The processor 61 may further include a main processor and a coprocessor, where the main processor is a processor configured to process data in an awake state, and is also referred to as a central processing unit (CPU); and the coprocessor is a low power consumption processor configured to process data in a standby state. In some embodiments, the processor 61 may be integrated with a graphics processing unit (GPU), and the GPU is configured to be responsible for rendering and drawing content required to be displayed on a display screen. In some embodiments, the processor 61 may further include an artificial intelligence (AI) processor configured to handle computing operations related to machine learning.

The memory 60 may include one or more non-transitory readable storage media, which may be non-volatile. The memory 60 may further include a high-speed random access memory and a non-transitory memory, for example, one or more magnetic disk storage devices and flash memory storage devices. In the embodiments, the memory 60 is at least configured to store the computer program 601, where the computer program, after being loaded and executed by the processor 61, may implement related steps of the method for detecting power consumption of the server disclosed in any one of the above embodiments. In addition, resources stored in the memory 60 may further include an operating system 602, data 603, and the like, and the storage manner may be temporary storage or permanent storage. The operating system 602 may include Windows, Unix, Linux, and the like. The data 603 may include, but is not limited to, component power consumption data, power supply power consumption data, and the like.

In some embodiments, the device for detecting power consumption of the server may further include a display screen 62, an input/output interface 63, a communication interface 64, a power supply 65 and a communication bus 66.

A person skilled in the art may understand that the structure shown in FIG. 6 does not constitute a limitation to the device for detecting power consumption of the server, and may include more or less components than those shown in the figure.

It may be understood that when the method for detecting power consumption of a server in the above embodiments is implemented in a form of software functional units and sold or used as an independent product, it may be stored in a computer readable non-transitory storage medium. Based on this understanding, the technical solutions of the present disclosure in nature or the portion contributed to the related art, or all or some of the technical solutions may be embodied in the form of a software product, and the computer software product is stored in a non-transitory readable storage medium to perform all or some of the steps of the method described in the embodiments of the present disclosure. Moreover, the aforementioned non-transitory readable storage medium includes media such as a USB flash disk, a mobile hard disk, a read-only memory (ROM), a random access memory (RAM), an electrically erasable programmable ROM, a register, a hard disk, a removable magnetic disk, a CD-ROM, a magnetic disk or an optical disk that may store program codes.

Figure 7:
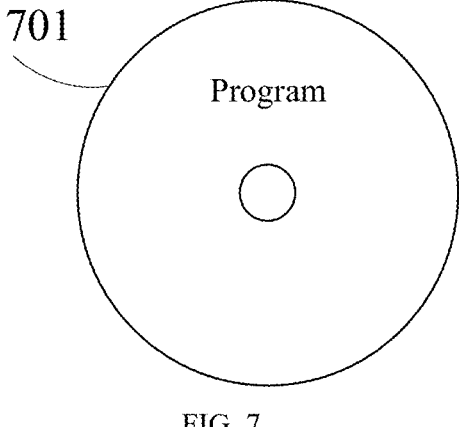
FIG. 7 is a block diagram of a non-transitory computer readable storage medium provided in some embodiments of the present disclosure.

Based on this, the embodiments of the present disclosure further disclose a non-transitory readable storage medium. As shown in FIG. 7, a non-transitory readable storage medium 701 stores a computer program, where the computer program, when executed by a processor, causes the processor to implement the steps of the method for detecting power consumption of the server disclosed above.

The system, the method, the apparatus and the device for detecting power consumption of the server, and the non-transitory readable storage medium provided in the embodiments of the present disclosure are described in detail above. The embodiments in the description are described in a progressive manner, each of the embodiments emphatically describes the differences from the other embodiments, and the same or similar parts of the embodiments may refer to each other. As for the apparatus disclosed in the embodiments, since it corresponds to the method disclosed in the embodiments, the description thereof is relatively simple, and the related parts may refer to the description on the methods.

A person skilled in the art may further understand that units and algorithm steps of the examples described with reference to the embodiments disclosed herein may be realized by using electronic hardware, computer software or a combination thereof. In order to clearly illustrate the interchangeability between the hardware and the software, the configurations and the steps of the examples have been generally described according to the functions in the above description. Whether these functions are executed by hardware or software depends on specific applications and design constraints of the technical solutions. A person skilled in the art may use different methods to realize the described functions with respect to each of the specific applications, but this implementation should not be considered beyond the scope of the present disclosure.

The system, the method, the apparatus and the device for detecting power consumption of the server, and the non-transitory readable storage medium provided in the embodiments of the present disclosure are described in detail above. The principle and the embodiments of the present disclosure are described herein with reference to the specific examples, and the description of the above embodiments is only used to help understand the method of the present disclosure and the core concept thereof. It should be noted that a person skilled in the art may make improvements and modifications on the present disclosure without departing from the principle of the present disclosure, and these improvements and modifications fall within the protection scope of the claims of the present disclosure.

The invention claimed is:

1. A system for detecting power consumption of a server having a plurality of components, comprising a baseboard management controller, a plurality of power supply units and a plurality of monitoring components corresponding to the a plurality of components of the server whose power consumption data is to be detected and collected, wherein each of the plurality of power supply units and each of the monitoring components comprises a real-time data register and a power consumption temporary storage register;

each t monitoring component is configured to store collected component power consumption data of the respective component to be detected into the real-time data register corresponding to the monitoring component; and copy component power consumption data at a current moment recorded in the real-time data register corresponding to the monitoring component to the power consumption temporary storage register corresponding to the monitoring component in response to receiving a power consumption read signal transmitted by the baseboard management controller;

each t power supply unit is configured to store collected power supply power consumption data into the real-time data register corresponding to the power supply unit; and copy power supply power consumption data at the current moment recorded in the real-time data register corresponding to the power supply unit to the power consumption temporary storage register corresponding to the power supply unit in response to receiving the power consumption read signal transmitted by the baseboard management controller; and the baseboard management controller is connected to each t power supply unit and monitoring component, and is configured to simultaneously transmit the power consumption read signal to each t power supply unit and monitoring component in response to receiving an overall power consumption read command; and read each t component power consumption data and power supply power consumption data from each t power consumption temporary storage register.

2. The system for detecting the power consumption of the server according to claim 1, wherein a general-purpose input/output pin of the baseboard management controller is connected in series to an alarm signal pin of each power supply unit and monitoring component, wherein the alarm signal pin is a bidirectional port pin supporting input and output; and the baseboard management controller is configured to simultaneously transmit the power consumption read signal to the alarm signal pin of each power supply unit and monitoring component in response to receiving the overall power consumption read command.

3. The system for detecting the power consumption of the server according to claim 2, wherein the monitoring component is configured to transmit an alarm signal to the baseboard management controller through the alarm signal pin in response to it is detected that an abnormality occurs in the respective component; and the baseboard management controller is configured to switch the baseboard management controller to a slave mode in response to receiving the alarm signal transmitted by the monitoring component, wherein the baseboard management controller stops transmitting the power consumption read signal to the monitoring component in the slave mode.

4. The system for detecting the power consumption of the server according to claim 3, wherein each monitoring component is configured to obtain a device type of the component to be detected which is monitored by the monitoring component; and generate the alarm signal according to a data format matched with the device type.

5. The system for detecting the power consumption of the server according to claim 4, wherein the baseboard management controller is configured to determine a target component to be detected corresponding to the alarm signal according to the data format of the alarm signal in response to receiving the alarm signal transmitted by the monitoring component; and display prompt information of a failure of the target component to be detected through a front panel.

6. The system for detecting the power consumption of the server according to claim 1, wherein each monitoring component is configured to, after copying the component power consumption data at the current moment recorded in the real-time data register corresponding to the monitoring component to the power consumption temporary storage register corresponding to the monitoring component, clear the power consumption temporary storage register corresponding to the monitoring component according to a set time interval, and copy the component power consumption data at the current moment recorded in the real-time data register corresponding to the monitoring component to the power consumption temporary storage register corresponding to the monitoring component.

7. The system for detecting the power consumption of the server according to claim 1, wherein each the monitoring component is configured to clear the power consumption temporary storage register corresponding to the monitoring component, and copy the component power consumption data at the current moment recorded in the real-time data register corresponding to the monitoring component to the power consumption temporary storage register corresponding to the monitoring component after copying the component power consumption data at the current moment recorded in the real-time data register corresponding to the monitoring component to the power consumption temporary storage register corresponding to the monitoring component and in response to receiving the power consumption read signal transmitted by the baseboard management controller again.

8. The system for detecting the power consumption of the server according to claim 1, wherein the baseboard management controller is configured to convert the component power consumption data and the power supply power consumption data read from each the power consumption temporary storage register into a histogram, and display the histogram through a front panel, wherein the histogram takes a component type as a horizontal axis and power consumption as a vertical axis.

9. The system for detecting the power consumption of the server according to claim 8, wherein the baseboard management controller is configured to read the component power consumption data and the power supply power consumption data from the respective power consumption temporary storage register according to a set time interval; and update the histogram according to the component power consumption data and the power supply power consumption data read at a current moment.

10. The system for detecting the power consumption of the server according to claim 1, wherein the baseboard management controller is respectively connected to the power consumption temporary storage register embedded in the monitoring component and the power consumption temporary storage register embedded in the power supply unit through a serial bus, and is configured to obtain the component power consumption data and the power supply power consumption data recorded in the power consumption temporary storage register.

11. The system for detecting the power consumption of the server according to claim 1, wherein the baseboard management controller is configured to sum all the power supply power consumption data to obtain total power supply power consumption; sum all the component power consumption data to obtain total component power consumption; determine whether a deviation between the total power supply power consumption and the total component power consumption is less than a set threshold; and simultaneously transmit the power consumption read signal to the power supply unit and the monitoring component in response to the deviation between the total power supply power consumption and the total component power consumption is greater than or equal to the set threshold.

12. The system for detecting the power consumption of the server according to claim 11, wherein the baseboard management controller is configured to increase a number of errors by one when the deviation between the total power supply power consumption and the total component power consumption is greater than or equal to the set threshold every time; determine whether the number of errors is greater than or equal to a set error limit; perform the step of simultaneously transmitting the power consumption read signal to the power supply unit and the monitoring component in response to the number of errors is less than the error limit; and display prompt information of abnormal power consumption through a front panel in response to the number of errors is greater than or equal to the error limit.

13. The system for detecting the power consumption of the server according to claim 1, wherein the baseboard management controller is configured to determine whether an alarm signal is received in response to receiving the overall power consumption read command; and simultaneously transmit the power consumption read signal to the power supply unit and the monitoring component in response to not receiving the alarm signal.

14. The system for detecting the power consumption of the server according to claim 13, wherein the monitoring component is configured to determine whether there is an unrecognizable data format in response to under the condition of receiving the power consumption read signal transmitted by the baseboard management controller; transmit the alarm signal to the baseboard management controller in response to there is the unrecognizable data format; and perform the step of copying component power consumption data at a current moment recorded in the real-time data register corresponding to the monitoring component to the power consumption temporary storage register corresponding to the monitoring component in response to under the condition that there is no unrecognizable data format.

15. The system for detecting the power consumption of the server according to claim 1, wherein the component to be detected comprises a memory, wherein the monitoring component corresponding to the memory is connected to the memory through a precision resistor and a current monitoring chip, and is configured to determine a memory voltage value corresponding to the memory according to a resistance value of the precision resistor and a current value detected by the current monitoring chip;

the monitoring component corresponding to the memory is connected to a power supply of the memory, and is configured to obtain a power supply voltage value of the power supply, and store the memory voltage value and the power supply voltage value into the real-time data register corresponding to the monitoring component; and the baseboard management controller is configured to obtain the memory voltage value and the power supply voltage value from the power consumption temporary storage register, convert the memory voltage value into a memory current value corresponding to the memory voltage value, and calculate memory power consumption based on the memory current value and the power supply voltage value.

16. The system for detecting the power consumption of the server according to claim 15, wherein the component to be detected comprises a central processing unit, wherein in response to an information storage unit at a front end of the central processing unit supports a power consumption reading function, the baseboard management controller is connected to the information storage unit, and is configured to read total power consumption recorded in the information storage unit; and obtain power consumption of the central processing unit by subtracting the memory power consumption from the total power consumption; or in response to an information storage unit at a front end of the central processing unit does not support a power consumption reading function, a current monitoring pin and a voltage monitoring pin of the monitoring component corresponding to the central processing unit are connected to a current detection pin of the information storage unit and a power supply pin of the central processing unit respectively, and the monitoring component corresponding to the central processing unit is configured to determine total power consumption according to an obtained current value and an obtained voltage value, and store the total power consumption into a power consumption temporary storage register corresponding to the central processing unit; and the baseboard management controller is configured to read the total power consumption recorded in the power consumption temporary storage register corresponding to the central processing unit, and obtain power consumption of the central processing unit by subtracting the memory power consumption from the total power consumption.

17. A method for detecting power consumption of a server, wherein the server comprises a plurality of components, a baseboard management controller, a plurality of power supply units and a plurality of monitoring components corresponding to the a plurality of components of the server whose power consumption data is to be detected and collected, wherein each of the plurality of power supply units and each of the monitoring components comprises a real-time data register and a power consumption temporary storage register;

wherein the method comprising:

each monitoring component is storing collected component power consumption data of the component to be detected into the real-time data register corresponding to the monitoring component; and copying component power consumption data at a current moment recorded in the real-time data register corresponding to the monitoring component to the power consumption temporary storage register corresponding to the monitoring component in response to receiving a power consumption read signal transmitted by the baseboard management controller;

each power supply unit is storing the collected power supply power consumption data into the real-time data register corresponding to the power supply unit; and copying power supply power consumption data at the current moment recorded in the real-time data register corresponding to the power supply unit to the power consumption temporary storage register corresponding to the power supply unit in response to receiving the power consumption read signal transmitted by the baseboard management controller; and simultaneously transmitting the power consumption read signal form the base board controller to each power supply unit and each monitoring component in response to receiving an overall power consumption read command, and triggering each power supply unit to copy power supply power consumption data at the current moment recorded in the real-time data register to each power consumption temporary storage register of the respective power supply unit and each the monitoring component to copy the respective component power consumption data at the current moment recorded in a real-time data register to the respective power consumption temporary storage register corresponding to the monitoring component; and reading the component power consumption data and the power supply power consumption data from each the power consumption temporary storage register.

18. A device for detecting power consumption of a server, comprising:

a memory configured to store a computer program; and a processor configured to execute the computer program to implement the steps of the method for detecting the power consumption of the server according to claim 17.

19. A non-transitory readable storage medium storing a computer program, wherein the computer program, when executed by a processor, causes the processor to implement the steps of the method for detecting the power consumption of the server according to claim 17.

* * * * *